Jan. 29, 1929.

E. E. GREVE 1,700,313

HOIST DRUM

Filed Sept. 24, 1924

INVENTOR.
Edgar E. Greve
BY W. D. Doolittle
ATTORNEY.

Patented Jan. 29, 1929.

1,700,313

UNITED STATES PATENT OFFICE.

EDGAR E. GREVE, OF BELLEVUE, PENNSYLVANIA.

HOIST DRUM.

Application filed September 24, 1924. Serial No. 739,735.

This invention is for a drum for hoists, such as are commonly used during drilling and other operations around oil or gas wells, and for other purposes.

In hoist drums as now commonly used, the side flanges of the drum have peripheral faces about which are brake bands, and braking is effected by contraction of such bands about the peripheral braking surfaces of the flanges. Very heavy loads, often running into many tons, are handled by these drums, and a considerable braking surface is required. A considerable amount of heat is also generated by the braking action, and drums as now constructed are unsatisfactory and the flanges frequently break because of the heat to which they are subject.

Furthermore, the tendency of the flanges to break is further increased by reason of the line, which, when wound in one or more layers on the drum, produces a lateral pressure or wedging action on the flanges.

The present invention has for its principal object to provide a drum wherein the flanges are less subject to breakage from such causes.

A further important object of the invention is to provide a drum having the flanges constructed in two parts in such manner as to compensate for expansion and contraction under varying thermal conditions, thereby eliminating breakage from such cause.

A further object is to provide a drum of generally improved design and construction.

The invention may be readily understood by reference to the accompanying drawings which illustrate a preferred embodiment of the invention, but to the construction of which the invention is not confined. In the drawings.

Figure 1:
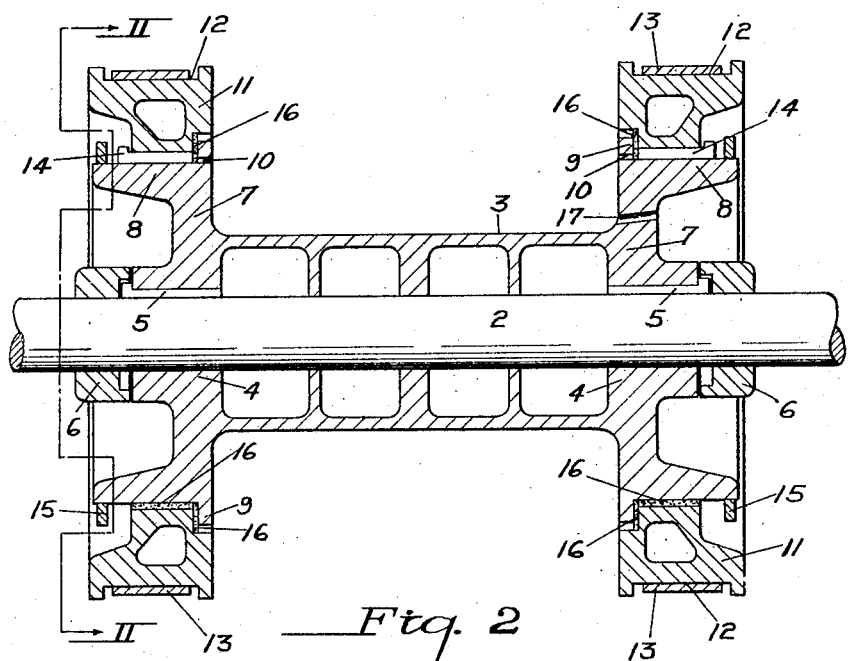
Fig. 1 represents a longitudinal section through the drum.
Figure 2:
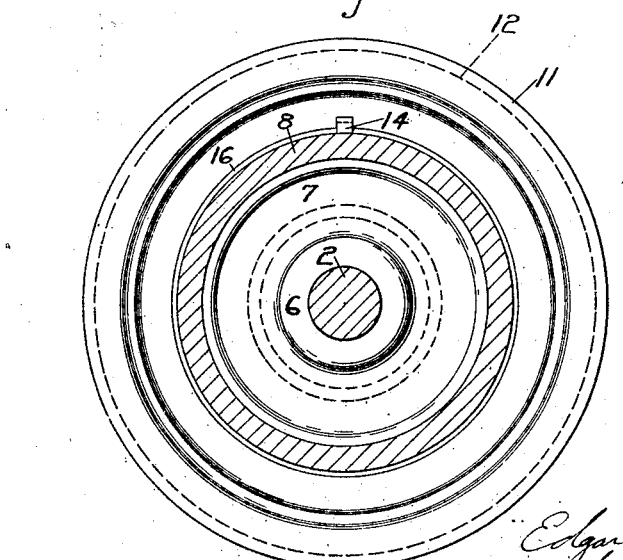
Fig. 2 represents an end view of the drum shown in Fig. 1.

In the drawings, 2 is the usual drum shaft, 3 is the body of the drum, and 4 designates inner hub portions of the drum, by means of which the drum is supported on the shaft. Keys 5 may be employed to rigidly connect the drum and shaft. At each end of the shaft may be key retainers 6, which may comprise rings shrunk in place on the shaft at each end of the drum. Their presence is not essential, however.

Carried by the drum at each end thereof, and preferably integral therewith, are short flanges or hubs 7 having a wide peripheral surface 8. The inner edge of each surface may have a bead 9 thereon, in which may be one or more suitably placed perforations 10, for the purpose hereinafter described.

Carried on the periphery of each hub surface 8 is a separate flange 11 preferably having a channeled periphery 12, in which the usual brake bands 13 may engage and be guided. The separate flange may be keyed to the hub flange by one or more suitable keys 14. Holes 10 are located opposite these keys in order to permit of the insertion of a suitable driving pin to be used in forcing the keys out, when necessary. A key retaining ring is indicated at 15.

Suitable heat insulation, preferably one or more thicknesses of sheet asbestos 16, are interposed between the separate flanges and the outer hubs on which they are carried.

With the construction thus provided, the braking flanges are virtually floating flanges carried by the drum. The heat of friction is practically all confined to these braking flanges and they are free to expand and contract naturally under the varying temperatures to which they are subject, without subjecting the integral hub flanges to any strain. Furthermore, the integral flanges 8 are relatively small, so that they can be cast more readily and with less chance of breakage, than the large ones heretofore used. The construction provided by my invention is also less subject to breakage because of the outward pressure or wedging action of the wound up cables.

A diagonal opening 17 may be provided in one of the hub flanges to which the end of the cable may be passed.

Various changes and modifications may be made in the device within the contemplation of the invention and under the scope of the appended claims.

I claim as my invention:

1. A hoist drum having a flange comprising outer and inner parts, one part having a braking surface thereon, and heat insulation interposed between the parts.

2. A hoist drum having a side flange provided with an inner supporting portion and an outer expansible braking portion separate therefrom and secured thereto, and heat insulation between the outer portion and the supporting portion.

3. A hoist drum comprising a flange having a beaded periphery, a brake flange secured to the periphery of said first flange and partially retained in position by the bead, a key securing the braking flange to the periphery of the first flange, key retaining means on the first flange, the bead of the periphery of the first flange having a hole therein opposite said key through which key driving means may pass for removing the key.

4. A hoist drum comprising a flange having a beaded periphery, a brake flange secured to the periphery of said first flange and partially retained in position by the bead, a key securing the braking flange to the periphery of the first flange, key retaining means on the first flange, and heat insulating material interposed between the first flange and the braking flange.

In testimony whereof I affix my signature.

EDGAR E. GREVE.